No. 640,876. Patented Jan. 9, 1900.
R. CHILLINGWORTH.
METHOD OF MAKING BELT PULLEYS.
(Application filed July 18, 1899.)

(No Model.)

WITNESSES:
Ella L. Giles.

INVENTOR
Rudolf Chillingworth
BY
Richardson
ATTORNEYS

THE NORRIS PETERS CO., PHOTO-LITHO., WASHINGTON, D. C.

UNITED STATES PATENT OFFICE.

RUDOLF CHILLINGWORTH, OF NUREMBERG, GERMANY.

METHOD OF MAKING BELT-PULLEYS.

SPECIFICATION forming part of Letters Patent No. 640,876, dated January 9, 1900.

Application filed July 18, 1899. Serial No. 724,321. (No model.)

*To all whom it may concern:*

Be it known that I, RUDOLF CHILLINGWORTH, manufacturer, a subject of the German Emperor, residing at Nuremberg, Bavaria, German Empire, have invented Improvements in Methods of Making Belt-Pulleys, of which the following is a specification.

Figure 1:
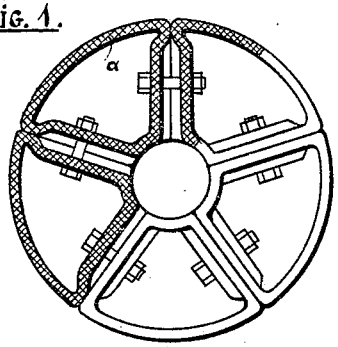
Figure 2:
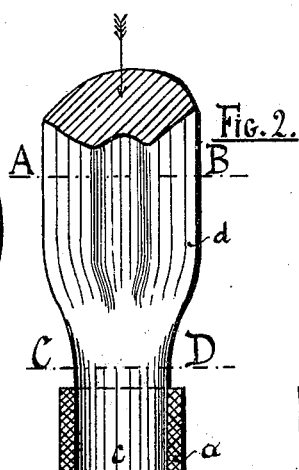
Figure 3:
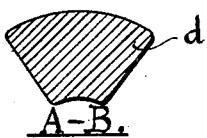

This invention has for its object a method of making belt-pulleys, even of the largest dimensions of pieces of tube, without fear of the strength or firmness of the belt-pulley being affected by the thinness of the walls of the pieces. For this object the belt-pulley, as shown in Figure 1 of the accompanying drawings, is formed of segment or sector shaped parts—for instance, in Fig. 1 of five parts. The method of making these segment-pieces consists in short pieces of tube of the length of the belt-pulley which is to be made being converted by drawing, pressing, or the like into sector-shaped flat metal bodies of the form shown in Fig. 1, after which these flat bodies may be arranged with their plane surfaces against one another and held together by screwing or the like to form a complete belt-pulley.

Figure 4:
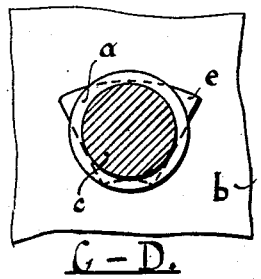
Figure 7:
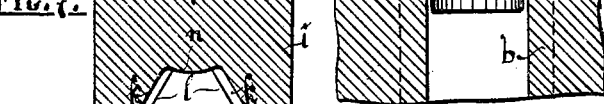
Figure 7:
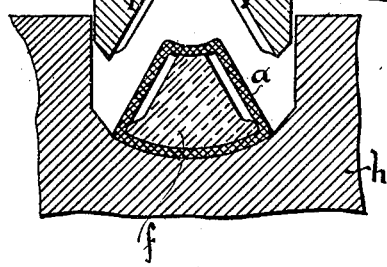
Figure 5:
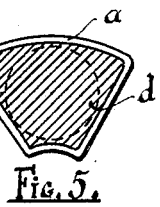
Figure 6:
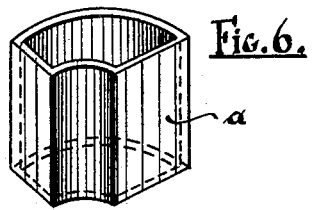
Figure 8:
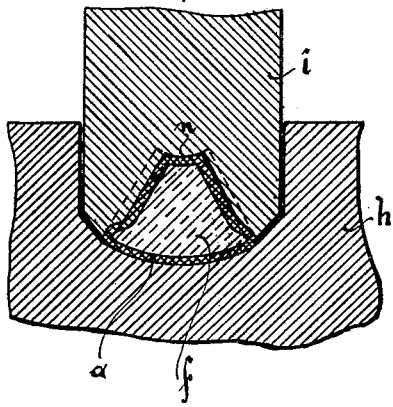
Figure 9:
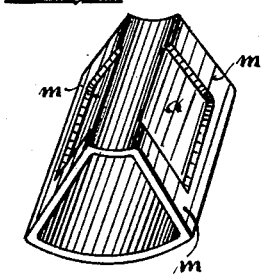
Figure 10:
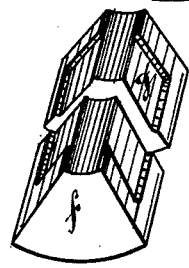

One way of carrying out this method is shown as an example in Figs. 2 to 10. A short piece of tube $a$ is placed with its lower edge on a matrix $b$, Fig. 2, and expanded into a segment or sector shaped flat metal body, Fig. 5, by means of a die or stamp $c\,d$ inserted in the piece of tube. In order to allow of this, the under part of the said stamp $c$ has a cylindrical cross-section, Fig. 4, and this cylindrical part fits exactly into the tube $a$, while the upper part $d$ has a sector-shaped cross-section, Fig. 3. The change from the cylindrical to the sector-shaped part is only a gradual one, so that when the stamp is pressed down the piece of tube $a$ is quite gradually expanded to the sector-shaped sheet-metal body shown in Figs. 5 and 6. The matrix $b$, as shown in Fig. 4, has a recess $e$, in which the stamp fits when depressed. The sheet-metal body $a$, Fig. 6, is then placed in a matrix $h$, Fig. 7, having a cylindrical hollowed-out part corresponding to the diameter of the belt-pulley to be formed, an intermediate piece in two parts $f\,g$ of the form shown in Fig. 10 being inserted in the flat metal body $a$. By pressing down a sector-shaped stamp $i$, the pressure-surfaces $k$ of which are provided with excrescences or projections $l$, as shown in Fig. 8, the flat tube walls are made to agree with the side surfaces of the intermediate pieces $f$ and $g$, Fig. 10, in such a way that the sector-shaped body $a$ (shown in Fig. 9 with lateral impressed surfaces $m$) is produced. Simultaneously this body $a$ on the depression of the stamp $i$, Fig. 8, which at $n$, Fig. 7, is cylindrically shaped to correspond with the hub-hole, receives a rounding corresponding to the cylindrical part of the stamp $i$, which rounding could only be imperfectly obtained by the expansion which takes place by the operation shown in Fig. 2. The sector-shaped flat metal bodies obtained in this manner and having the form shown in Fig. 9 are placed together, with their impressed surfaces in contiguity and combined or connected by means of screwing or the like in the manner shown in Fig. 1 to form a belt-pulley in the present case composed of five parts, but in any case of several parts.

Having now particularly described and ascertained the nature of my said invention and in what manner the same is to be performed, I declare that what I claim is—

The herein-described method of making belt-pulleys consisting in expanding a series of tubular sections into segmental shape and securing said sections together to form the complete pulley, substantially as described.

In witness whereof I have hereunto set my hand in presence of two witnesses.

RUDOLF CHILLINGWORTH.

Witnesses:
ANDREAS STICH,
OSCAR BOCK.